July 14, 1953
R. L. HASCHE
2,645,673
PROCESS OF PRODUCING ACETYLENE
Filed Dec. 8, 1945
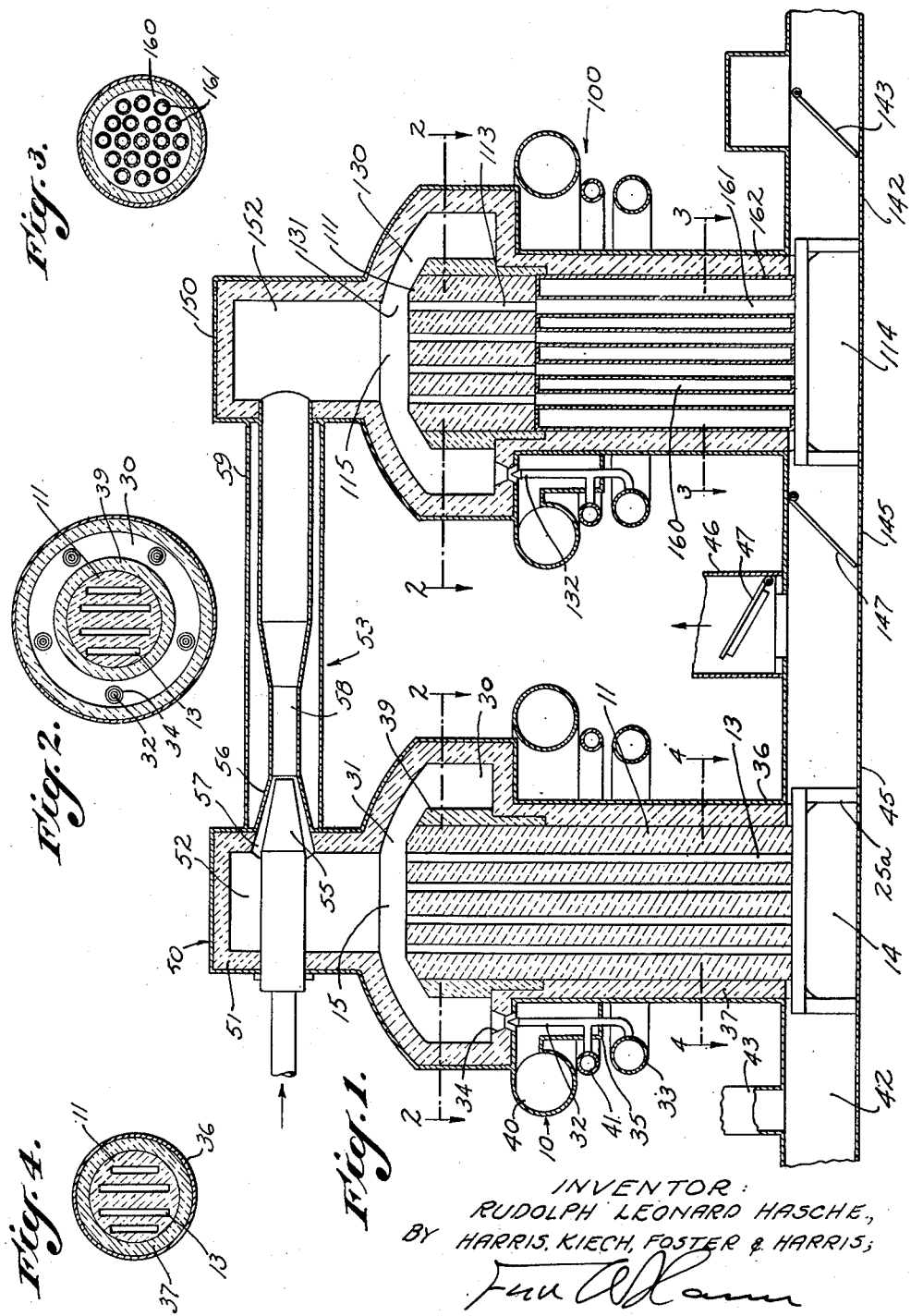
INVENTOR:
RUDOLPH LEONARD HASCHE,
BY HARRIS, KIECH, FOSTER & HARRIS;
FOR THE FIRM
ATTORNEYS.

Patented July 14, 1953

2,645,673

UNITED STATES PATENT OFFICE 2,645,673

PROCESS OF PRODUCING ACETYLENE

Rudolph Leonard Hasche, Johnson City, Tenn., assignor, by mesne assignments, to Eastman Kodak Company, Rochester, N. Y., a corporation of New Jersey Application December 8, 1945, Serial No. 633,846

6 Claims. (Cl. 260—679)

My invention relates to a process by which acetylene may be produced from stock hydrocarbons.

A suitable stock hydrocarbon may be methane or a hydrocarbon of the methane series, such, for example, as methane, ethane, propane, or butane, or a gaseous mixture containing one or more of said hydrocarbons. Natural gasoline, if heated, produces a suitable stock hydrocarbon. Natural gas is such a hydrocarbon, and many processes, for example, oil refining, produce gases which are excellent stock hydrocarbons.

It is an object of my invention to first produce from a charging stock, hereinafter called for convenience a first gas, containing a suitable stock hydrocarbon, certain intermediate products. The term "intermediate hydrocarbon products" should be construed to mean products produced by heating the first gas, which products are then found in a second gas, these intermediate products being, for example, ethylene, propylene, and other hydrocarbons which, upon being subjected to higher temperatures, tend to form acetylene. In practice, ethylene is readily formed at relatively low temperatures, for example, at temperatures below 1500° F., and it is one of the desirable intermediate products.

It is an object of my invention to provide a process that will not only produce these intermediate products, but which will produce a gas containing substantial amounts of acetylene, this final gas for convenience being hereinafter called a fourth gas. The term "a substantial amount of acetylene" should be construed to mean a volume of acetylene at least equal to two per cent of the total volume of the gas containing said acetylene.

My process is preferably operated with the gases passing therethrough at or near atmospheric pressure. The term "at or near atmospheric pressure" should be construed to mean a pressure as close to atmospheric pressure as can be maintained conveniently as the gas is being forced through the apparatus as described.

It is an object of my invention to provide a process which can be conducted in regenerative furnaces, that is, furnaces each having a regenerative mass which is operated in a recurring cycle consisting of a heating period in which the mass is heated to a maximum temperature, a purging period in which products of combustion, used to heat the mass during the heating period, are driven from openings in the mass, and a treating period in which the charging stock is brought into contact with the heated surfaces of the mass to produce the desired conversion.

It is an object of my invention to provide a process in which a charging stock or first gas is first converted into a second gas containing intermediate hydrocarbons, for example, propylene and ethylene, which, upon being heated, readily form acetylene, this first conversion being accomplished in a first regenerative mass, and in which these intermediate hydrocarbons are then converted into a gas containing substantial amounts of acetylene in a second regenerative mass, the masses being each independently heated to that degree necessary to enable each to perform its desired function. The partial pressure of the intermediate hydrocarbons is reduced by dilution of the second gas with an inert diluent to form a third gas before said third gas is delivered to the second regenerative mass. The conversion of stock hydrocarbons to intermediate hydrocarbons may be accomplished under different conditions as to time of reaction, heat, and pressure than the conversion of these intermediate hydrocarbons to acetylene, and thus it is desirable to use two independent regenerative masses in which time of reaction, heat, and pressure may be independently controlled.

Further objects and advantages will be made evident hereinafter, as will be obvious to a man skilled in the art after he has read and understood this specification.

In the drawings, which are solely for illustrative purposes, I show an apparatus in which my process may be conducted. In these drawings:

Fig. 1 is an elevation, partly in section, certain instrumentalities readily supplied by a man skilled in the art being omitted to simplify the drawings and description;

Fig. 2 is a section on a plane represented by the line 2—2 of Fig. 1, this section being the same for each of the regenerative furnaces;

Fig. 3 is a section on a plane represented by the line 3—3 of Fig. 1; and

Fig. 4 is a section on a plane represented by the line 4—4 of Fig. 1.

The intermediate hydrocarbons are formed in a first furnace 10 which contains a regenerative mass 11. The regenerative mass 11 may be formed of loose Carborundum bricks so placed as to provide vertical, substantially straight, and open primary passages 13 which extend through the mass 11 and connect a primary space 14 below the mass with a secondary space 15 above the mass.

The regenerative mass is so constructed that it can be supported wholly on a steel structure 25a in the primary space 14. This space 14, as will be understood from the description appearing later herein, never contains gas at a temperature which will substantially impair the strength of steel, and the lower end of the regenerative mass 11 never reaches such a destructive temperature.

Surrounding the upper end of the regenerative mass 11 is an annular combustion chamber 30, which is in communication with the secondary space 15 through an uninterrupted annular throat 31. Combustion in this space is provided by five equally spaced burners 32, each fed with gas from a fuel gas manifold 33. The combustion products in the space 15 may have a temperature of 3200° F. to 3400° F. The burners 32 discharge through openings 34 in the lower wall of the combustion space 30, these openings connecting the combustion space 30 with pipes 35 forming part of each burner. A steel shell 36 surrounds the mass 11 and the combustion chamber 30. Surrounding the mass 11 inside the shell 36 is an annular layer of heat insulating material 37. Surrounding the upper end of the regenerative mass 11 is a ring of Carborundum 39. Various pipes may also be heat insulated externally by heat insulating material, not shown. Air is supplied to the pipes 35 from an air manifold 40, and steam is admitted into the burners 32 from a steam manifold 41.

I prefer to line the inside of the combustion chamber 30 with Carborundum brick, but it should be understood that Carborundum is merely a preferred refractory material and wherever I have specified its use any refractory material having satisfactory characteristics may be used. In fact, in actual furnace construction I do not use Carborundum as the material for the annular layer 37, in which a low thermal conductivity is desirable.

The primary space 14 is provided with an inlet pipe 42 through which the gas to be processed may be supplied to the space 14, and steam or other inert diluent gas may be supplied to the primary space 14 through a pipe 43. The pipes 42 and 43 are provided with valves, as are the pipes that supply fuel gas to the pipes 35, and as is the pipe supplying steam to the burners 32, these valves also not being shown. The primary space 14 also has an outlet pipe 45 through which combustion gases are conducted to a stack 46 through a valve 47.

Both the first furnace above described and the second furnace to be later described are operated in a recurring cycle which consists of a heating period, a purging period, and a treating period, each period in the second furnace occurring at the same time that a similar period occurs in the first furnace. The operation of the first furnace is as follows:

At the beginning of the heating period, the valve 47 into the stack 46 is open, and during the heating period no gas is supplied to the primary space 14 through the pipe 42. Fuel gas is supplied to the burners 32 from the manifold 33, and air for combustion is supplied to the pipes 35 from the manifold 40. It is important to so regulate the flow of air and gas that each of the burners will produce combustion products of about the same volume and at about the same temperature. In the drawings, I show five burners 32, but in large furnaces more than five burners are desirable. The burners may be inserted through the side walls of the combustion chamber 30, their exact location being somewhat a matter of convenience. If the burners are properly operated, the combustion chamber 30 is filled with an annular ring of combustion gases at a fairly uniform temperature of 3200° F. to 3400° F. I have found that in a properly designed furnace a heat liberation of 750,000 to 1,000,000 B. t. u. per hour for each cubic foot of combustion space is possible. This ring of combustion products surrounds the upper end of the ring 39 and tends to heat it. The combustion products flow evenly through the throat 31, which is constricted to an area perpendicular to the gas flow of at least one-third of the area on a horizontal plane of the combustion space 30. This constriction tends to promote an even flow of combustion products through the throat 31. Combustion products flow through the throat at a rather uniform velocity and temperature all around the throat, and this velocity is lowered in the space 15 before the gases change direction and flow downwardly through the primary passages 13. The changes in velocity and direction of the combustion gases in passing from the combustion chamber 30 to the space 15 tend to mix the gases and produce a very uniform temperature of the gases entering each of the passages 13, which is highly desirable.

The combustion products pass from the space 14 through the valve 47 to the stack 46. The regenerative mass 11 is raised to a sufficient temperature to heat the gas flowing through the passages 13 to form a second gas containing intermediate products, and when the mass is sufficiently heated the heating period terminates, combustion is stopped, and the valve 47 is closed. The heating period may be from 1 to 2 minutes.

The purging period follows the heating period, steam being admitted to the primary space 14 from the pipe 42 and flowing upwardly through the passages 13 and the space 14, clearing these spaces of combustion gases. Steam, at the same time, is admitted to the burners 32 from the manifold 41 to purge the combustion chamber 30 of combustion products, and the flow of steam into the combustion chamber 30 from the burners 32 is maintained until the end of the treating period to keep treated or second gas out of the combustion space 30.

The treating period follows the purging period and completes the cycle. During the treating period the first gas flows upwardly from the primary space 14 to the secondary space 15 through the passages 13, and second gas containing the desired intermediate products is formed. First gas is supplied to the primary space 14 through the pipe 42.

Situated inside a continuation of the shell 36 is a dome 50, which is lined with Carborundum brick 51 and which forms a space 52 which is a continuation of the space 15. An injector 53 draws the second gas from the first furnace, this gas containing the desired intermediate products, such, for example, as ethylene. This injector 53 is actuated by a motive gas delivered thereto by a pipe 54. This motive gas may be steam, but I prefer to use natural gas. The injector 53 delivers the motive gas to a nozzle 55, which delivers the motive gas into the throat 56 of the injector, thus drawing the second gas from the space 52 through a space 57 and delivering it to a pipe 58. In the pipe 58 the motive gas is mixed with the second gas to form a third gas, which is delivered to a dome 150 on the second furnace 100. The injector 53 and the nozzle 55 are provided with water jackets to enable them to withstand the heat of the second gas, the water jacket of the injector being shown at 59.

The second furnace 100 has a regenerative mass 111, which is similar to the mass 11 of the first furnace 10 except that it has less axial height. The upper portion of the furnace 100 is quite similar to the furnace 10, the furnace 100 having a combustion space 130 in which combustion occurs just as it does in the space 30, the combustion gases passing through a throat 131 into a space 115 which is an extension of a space 152 inside the dome 150. This combustion is fed and controlled during the cycle synchronously, as to each period of the cycle, as in the combustion space 30. The regenerative mass 111 of the second furnace 100, however, is placed on a steam boiler 160 having tubes 161 which are so placed that they communicate with and serve as extensions of the passages 113 through the regenerative mass 111. The space inside a shell 162 of the boiler 160 and around the tubes 161 is at all times kept filled with water under superatmospheric pressure, the boiler being kept full of water at all times by means common in the boiler art and therefore not shown. The tubes 161 deliver gas to a space 114 below the boiler. The space 114 communicates through a pipe 145 and a valve 147 and the valve 47 with the stack 46, to provide an outlet for the products of combustion used to heat the mass 111. The space 114 also communicates with a pipe 142 having a valve 143 therein. The final product or fourth gas is delivered to the pipe 142.

The furnace 100 also operates on the recurring cycle of the first furnace 10, the two furnaces being heated, purged, and treating gas at the same time. The furnace 100, however, operates differently from the furnace 10 in that, although both furnaces are heated by products of combustion passing downwardly, the second furnace is purged by a downward flow of steam from the burners and the third gas from the space 152 passes downwardly through the passages 113, whereas in the first furnace the purging and treating flow is upward. During the heating period gases of combustion are cooled in the passages 113, their heat producing steam in the boiler.

The method of operation of the apparatus described is as follows:

The regenerative masses 11 and 111 are heated to the desired temperature during the heating period by passing products of combustion from the combustion spaces 30 and 130 downwardly through the passages 13 and 113, the combustion products from both furnaces passing off through the stack 46. The furnaces are then purged to the stack 46, as previously described. The operation of all of the valves is automatically controlled by a timing device (not shown).

During the treating period the gases to be treated first pass through the regenerative mass 11, then through the injector 53, and then through the regenerative mass 111. The first gas, or charging stock, enters the space 14 from the pipe 42. This first gas contains the stock hydrocarbons, and in passing through the passages 13 of the first regenerative mass 11 this first gas is converted to a second gas containing desirable intermediate hydrocarbons. The second gas may be at a temperature below 2000° F. when it is delivered to the space 52 in the dome 50. The principal intermediate hydrocarbon usually found in this gas is ethylene. This second gas is drawn into the injector 53 sufficiently below atmospheric pressure to insure a good gas flow through the passages 13, and in the injector 53 the gas pressure is increased sufficiently above atmospheric pressure to insure a good gas flow through the passages 113 and the tubes 161. The pressure on the third gas in the space 152 is therefore slightly higher than the gas pressure in the space 52. The third gas entering the space 152 differs from the second gas in that the third gas is considerably diluted by motive gas, such, for example, as hydrogen, methane, natural gas, or steam. This reduces the partial pressure on the intermediate hydrocarbons, which promotes their conversion to acetylene. This third gas flows through the passages 113 of the second regenerative mass 111 at high velocity and is in these passages for a very short time, preferably less than $\frac{1}{10}$ of a second. The mass 111 is preferably at a temperature close to 3000° F., and, due to the fact that treating and heating are produced by gas flows in a downward direction, the mass 111 is uniformly heated. In the passages 113 the third gas is changed to a fourth gas that contains a substantial amount of acetylene.

Acetylene is, however, a transient product at the temperatures above 2800° F. at which the fourth gas may be delivered from the passages 113 into the tubes 161 in the boiler, and at that temperature the acetylene tends to break down into hydrogen and carbon. The fourth gas flowing at high velocity enters the tubes 161 as soon as it leaves the passages 113 and is quickly cooled in the tubes 161 to a temperature at which acetylene is stable, for example, to a temperature of 1200° F. or below.

The fourth gas containing substantial amounts of acetylene passes through the pipe 142 and valve 143 to suitable separation apparatus (not shown), in which the acetylene is separated from the fourth gas. This fourth gas from which acetylene has been separated is a valuable fuel gas and may be burned in the combustion chambers 30 and 130 to supply the combustion gases that heat the regenerative masses.

While the first gas may conveniently be at or near atmospheric pressure during the time it is being heated, it is possible that when using some charging stocks it is desirable to operate the first furnace under a partial vacuum, and experience shows that the formation of desirable intermediate products at any temperature is promoted by lowering the partial pressure on the stock hydrocarbon. This partial pressure may be produced by lowering the pressure of the first gas or reducing the proportion of stock hydrocarbon therein.

My process produces a very high yield of the desired hydrocarbons, which is in part due to the use of the short regenerative mass 111 which is maintained at a high temperature which is fairly uniform throughout. Good results have been attained in making acetylene in the electric arc, although the yields have been much lower than in my process and the cost per pound of the acetylene produced has been high. In electric arc processes the gas is not uniformly heated, as the arc itself consists of a very hot and small core surrounded by gases of lower temperature. In my process the treating zone, that is, the space in the passages 113, is uniformly heated so that all the gas is subjected to a uniformly high temperature. Also, in any arc process the heat of reaction, that is, the heat necessary to cause the formation of acetylene, is provided by the conversion of electrical energy to heat. In my process this heat is provided by burning the waste gases from the process, and the energy so released costs only a small fraction of the cost of electrical energy.

My process has, however, some of the advantages of the arc processes in that the contact time of the reaction to acetylene is very short. In other words, the gases are very quickly and uniformly heated in the passages 113 and are immediately passed to the tubes 161 of the boiler 160, where they are very quickly cooled to a temperature at which acetylene is stable. The speed of heat transfer from the regenerative mass 111 to the gas flowing through the passages 113 is very high, being proportional to the difference in temperature between the mass 111 and the gases flowing therethrough. The whole mass is at a substantially uniform temperature because the gases of combustion used to heat it flow in the same direction as the gas to be treated, and a very high rate of heat transfer is maintained throughout the whole length of the passages 113. Due to this high rate of heat transfer, the time during which the gases are subjected to high temperature is very short. The acetylene is very quickly formed, and, after being formed, it is not given time to decompose to hydrogen and carbon.

In any such process some decomposition will, however, occur, and some carbon will appear in the tubes 161. This carbon is, however, burned out by the hot gases of combustion that flow through these tubes during the heating period. The heat in the gases of combustion and in the treated gas flowing through the tubes 113 is, however, not lost, as it is utilized to form steam in the boiler 160.

Various processes are in use which operate at pressures considerably above or below atmospheric pressure. My process uses no such pressures anywhere in the apparatus.

The words "upwardly" and "downwardly" and other words which denote a gravitational relationship are used herein to merely denote relationship of the parts when upright furnaces such as those shown and described are used, the process being operative if the furnaces are, or either of them is, laid on their sides or in any other position.

I claim as my invention:

1. A process of producing an off gas which contains a substantial amount of acetylene from an in-gas containing a suitable stock hydrocarbon which can be pyrolyzed to produce acetylene which comprises firing in the same direction a first and a second substantially adjacent regenerative heating zones, the second zone being fired to above 2000° F. and to a higher temperature than the first zone, purging the zones, passing the in-gas into the first regenerative zone at a point in the zone substantially opposite from the point of firing, conducting the in-gas through the first zone and out thereof substantially at the point of firing, injecting a motivating gas into the gas which emerges from the first zone and conducting this motivated gas into the second hotter regenerative zone, the point of entry into the second hotter regenerative zone being substantially at the point of firing of the second zone whereby the motivated gas is heated to a relatively high temperature in less than $\frac{1}{10}$ of a second, causing the production of an acetylene-containing gas, quickly cooling this gas containing acetylene, stopping the flow of gas through said two regenerative zones before the temperature of the second zone falls below that at which the pyrolysis of gas to acetylene ceases and thereafter repeating the cycle.

2. A process for producing an off-gas which contains a substantial amount of acetylene from an in-gas containing suitable stock hydrocarbon which can be pyrolyzed to produced acetylene which comprises firing in the same direction substantially adjacent first and second regenerative heating zones, the second heating zone being fired to an acetylene-forming temperature and a temperature higher than the temperature of the first zone, passing the in-gas into the first zone at a point in the first zone substantially opposite from the point of firing of the first zone, conducting the in-gas through the first zone and out of the first zone substantially at the point of firing, motivating the gas emerging from the first zone and conducting this motivated gas into the second hotter zone, the motivated gas being conducted into the second zone at substantially the point of firing of the second zone whereby the movtivated gas is quickly cracked at the higher temperature to the off-gas aforementioned containing substantial amounts of acetylene, stopping the flow of gas through said zones before the temperature of the second zone has fallen below that at which the effective pyrolysis of the gas to acetylene ceases and thereafter repeating the cycle.

3. A process for producing an off-gas containing substantial amounts of acetylene from feed stock consisting essentially of normally gaseous hydrocarbons by the application of a plurality of regenerative heating steps in a first and second regenerative heating zones containing slots which comprises: passing said gaseous hydrocarbons upwardly through slots in a first regenerative heating zone the top of which zone is at a temperature substantially higher than the bottom thereof and of a temperature sufficient to convert at least a part of said gaseous hydrocarbons into a second gas containing intermediate hydrocarbon products more readily convertible to acetylene, however, the temperature of this first zone not materially exceeding 2000° F., injecting a motive gas into this second gas, said injecting being in a manner that the motive gas draws the second gas toward the top of the second regenerative heating zone and mixes with this second gas to form a third gas, passing this third gas at a high velocity downwardly through slots in this second regenerative heating zone, said zone being shorter and hotter than the first zone aforesaid whereby the third gas is heated for less than $\frac{1}{10}$ of a second at a temperature sufficient to cause substantial acetylene formation but not in excess of 3000° F.; and quickly cooling the acetylene containing gas produced to a temperature at which acetylene is reasonably stable.

4. A process in accordance with claim 3 in which the motive gas introduced is essentially comprised of methane.

5. In a process for producing an off-gas which contains a substantial amount of acetylene from an in-gas containing a suitable stock hydrocarbon which can be pyrolyzed to produce acetylene, by procedure which comprises firing in the same direction a first and a second substantially adjacent regenerative heating zones, the firing of the zones being against the upper ends thereof, and the second zone being fired to an acetylene-forming temperature and a higher temperature than the first zone and after the firing of the zones as aforesaid carrying out the improvement steps which comprises passing the in-gas into the first zone at the lower end thereof opposite the point of firing, withdrawing the gas from the first zone substantially at the point of firing, and immediately motivating and conducting the gas emerging from the first zone into the second zone at the point of firing whereby it is quickly subjected to the higher temperature aforementioned, thereby causing the formation of acetylene.

6. In a cyclic process for the thermal conversion of an in-gas containing a normally gaseous stock hydrocarbon which can be pyrolyzed to produce a cracked off-gas containing a substantial amount of acetylene, said process being carried out in an apparatus comprising first and second channeled regenerative masses communicating through a chamber connecting adjacent ends of the masses, the steps which comprise firing the regenerative masses from the chamber with hot combustion products which are exhausted from the chamber into the ends of the masses connected therewith, thence through the channels of the masses and out of the masses at the ends thereof opposite the chamber-connected ends, continuing the firing until an acetylene-forming temperature is obtained in the second mass and a temperature sufficient at least to form substantial amounts of ethylene is obtained in the first mass and ceasing the firing operation, then while at least the chamber-connected end of the first mass is still at an ethylene forming temperature but at a temperature insufficient to produce a gas containing a substantial amount of acetylene, passing the in-gas into the channels of the first mass at the end thereof opposite the chamber-connected end and through the channels in a direction opposite to that in which the combustion products were passed, thereby heating the in-gas to the ethylene forming temperature by subjecting it to progressively hotter surfaces in the channels of the first mass, withdrawing resulting partially pyrolyzed heated gas from the channels of the first mass at the chamber-connected end thereof and immediately and without delay conducting the heated gas emerging from the first mass directly through the chamber into the channels of the second mass at the chamber-connected end thereof and rapidly through the channels in the same direction in which the hot combustion products were passed through, thereby subjecting the partially pyrolyzed gas for a very short period of time less than about $\frac{1}{10}$ of a second to the temperature of the second mass, the second mass still being at a temperature at which substantial acetylene formation takes place, thereby causing the formation of cracked off-gas containing a substantial amount of acetylene, withdrawing the resulting cracked off-gas from the channels of the second mass at the end thereof opposite the chamber-connected end, and immediately cooling the withdrawn off-gas to a temperature at which its constituents are reasonably stable.

RUDOLPH LEONARD HASCHE.

References Cited in the file of this patent

UNITED STATES PATENTS

| Number | Name | Date |
|---|---|---|
| 1,234,886 | Eldred et al. | July 31, 1917 |
| 1,880,309 | Wulff | Oct. 4, 1932 |
| 2,030,070 | Morrell | Feb. 11, 1936 |
| 2,113,536 | Grebe et al. | Apr. 5, 1938 |
| 2,164,762 | Baumann et al. | July 4, 1939 |
| 2,319,679 | Hasche et al. | May 18, 1943 |
| 2,383,772 | Chaney et al. | Aug. 28, 1945 |
| 2,475,093 | Hasche | July 5, 1949 |

FOREIGN PATENTS

| Number | Country | Date |
|---|---|---|
| 390,849 | Great Britain | Apr. 5, 1933 |
| 416,921 | Great Britain | June 26, 1933 |
| 471,837 | Great Britain | Sept. 10, 1937 |
| 479,438 | Great Britain | Feb. 4, 1938 |

OTHER REFERENCES

Hasche Chem. and Met. Eng., July 1942, pp. 78–83.